INVENTORS
WILLIAM H. LUEHRMANN
WILLIAM H. PARKER

BY Alexander & Dowell

ATTORNEYS

United States Patent Office 3,398,394
Patented Aug. 20, 1968

3,398,394
MARINE SEISMIC ARRAY DEPTH CONTROL
William H. Luehrmann, Dallas, and William H. Parker, Richardson, Tex., assignors to Teledyne Industries, Inc., Geotech Division, a corporation of California
Filed Dec. 9, 1966, Ser. No. 600,588
5 Claims. (Cl. 340—7)

ABSTRACT OF THE DISCLOSURE

A seismic-streamer towing and depth control apparatus which is improved by simplifying the components which are immersed outside the towing vessel to include only several plastic tubes, one inside the other, and a sleeve smoothly coupling the larger tube to the streamer for very quiet towing; and further improved by placing the remaining depth-control components all inside the vessel where their bulk is no handicap, these latter components comprising a source of gas pressure, an adjustable regulator, and ordinary pressure-differential responsive apparatus including servo means operating a control valve for introducing gas into the larger tube to cause the hydrostatic pressure measured through the smaller tube to approach the pressure from the adjustable regulator, the latter pressure representing the desired towing depth.

---

This invention relates to improvements in underwater seismic survey apparatus of the type employing an array towed behind a vessel, and more particularly relates to improvements in means for controlling the depth at which the array, comprising one or more streamers, is towed.

It is well-known in the marine seismic profiling art that towed transducer streamers should be maintained at a constant preselected depth as determined by the type of seismic profiling being conducted. For example, there is often an effort made to tow a hydrophone array at a predetermined depth such that the surface reflection resulting from the generated seismic disturbance will arrive back at the hydrophone array 180 degrees out of phase with the signal travelling directly to the hydrophone array from the disturbance, whereby the surface reflection will tend to be canceled out. Moreover, it is desirable to tow the array at a preselected depth in order to minimize surface wave noises, towing vessel noises, etc., and in order to provide substantially uniform results with respect to reflection signals being recorded. It has proven difficult to maintain the desired streamer depth accurately from aboard the towing vessel using prior art techniques. Moreover many of the prior art techniques introduce spurious noise into the array. Automatic control of the depth of the streamer is desirable since its depth tends to vary with variations in the vessel speed, it being especially difficult to tow a streamer at relatively high speeds, for instance 10 knots, without having the streamer rise to the surface of the water.

It is the principal object of this invention to provide improved apparatus for continuously controlling the depth of a streamer from a location aboard the vessel, and for providing means for substantially continuously monitoring the actual depth. The invention will be described with reference to a practical embodiment wherein the streamers are hydrophone streamers, but it is to be understood that the invention has utility in connection with the maintaining of other objects at desired depths.

It is another important object of the invention to provide a system for continuously controlling the depth of a streamer while at the same time avoiding the introduction of spurious noise at the geophone array, as usually occurs when adjustable planing surfaces are used for this purpose. The present invention provides apparatus capable of accomplishing extremely quiet towing.

Other objects and advantages of the present invention will become apparent during the following discussion of the drawing, wherein.

Figure 1:
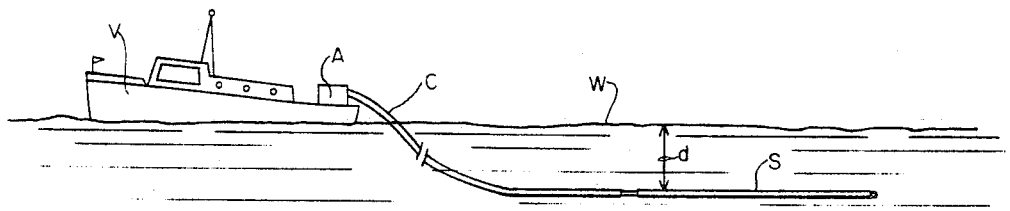
FIG. 1 is a diagrammatic view of a vessel towing a streamer through the water at the end of a leader cable.

Referring now to the drawing, FIG. 1 shows a vessel V towing a leader cable C attached to a streamer S towed at a depth $d$ beneath the surface of the water W. This cable is connected to apparatus A carried aboard the vessel, a suitable form of the apparatus being shown in FIG. 2 of the drawing. The leader cable C may conveniently comprise a flexible hose held by suitable means such as a clamp K aboard the vessel V. The leading end of the cable C is closed by a plug P so as to make that end of the cable gas-tight. The trailing end the cable C is connected to a sleeve T having a number of holes H extending therethrough so as to admit water into the cable. The sleeve T connects to the end of a flexible streamer member S, the leading and trailing ends of which are terminated by plugs R and the streamer being filled with a suitable fluid F, such as oil.

Within the leader cable C are a series of weights D which may on a practical basis comprise a length of copper cable flexible enough to permit the leader C to be rolled up on a drum (not shown), for instance for storage aboard the vessel. As a practical matter, a 50–100 foot length of #2 gauge copper cable is inserted within the streamer C to weight it so that its buoyancy when filled with water is negative. The illustrated streamer S includes a plurality of hydrophone transducers E of any suitable type, these transducers being connected to electric wiring 10 by which they are coupled through the cable C and the sealing plug P to a seismic recording device 12 of any suitable type.

There are two tubes which pass through the sealing plug P into the leader cable C. One of these tubes 14 passes through the plug, but ends just beyond it within the cable C so that compressed gas from the tank 16 can be used to blow the water partly out of the leader cable C through the holes H in order to adjust the buoyancy of the cable. The other tube 18 passes through the plug P down through the cable C and out through one of the holes H. This tube 18 is used to measure the actual depth of the streamer in a manner to be discussed hereinafter in greater detail.

Returning now to a discussion of the tube 14, the compressed gas taken from the tank 16 is maintained at a constant preselected pressure by the regulator 20 which provides output at the same pressure through two different pipes 22 and 24 to the valves 26 and 28, respectively. The valve 26 can be automatically controlled by a differential servo mechanism 30 of any appropriate type. There are a number of patents disclosing suitable pneumatic servo mechanisms which will operate especially well in the present pneumatic environment. The pressure in the tube 14 is conveniently indicated on a gauge 34, which may be calibrated to show approximate cable depth.

Figure 2:
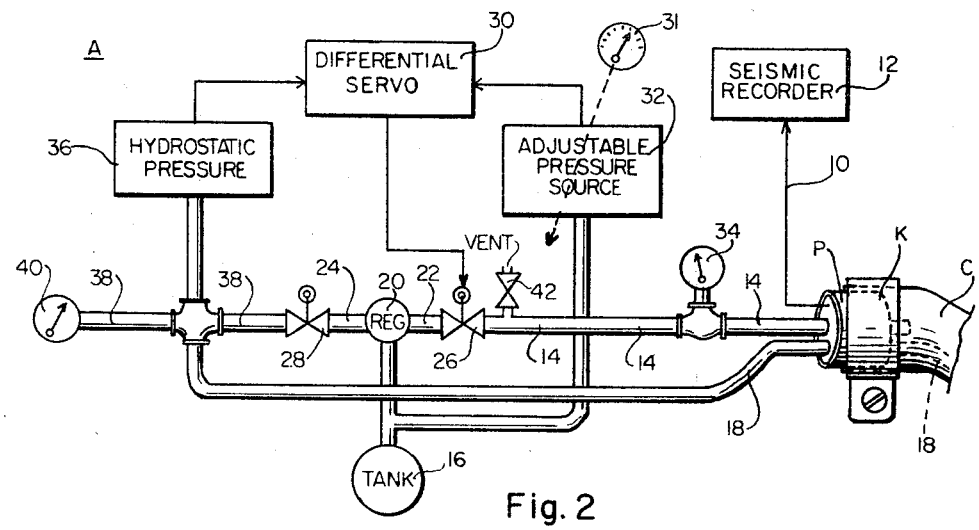
FIG. 2 is a block diagram showing one practical embodiment of a system for automatically maintaining the desired streamer depth.
Figure 3:
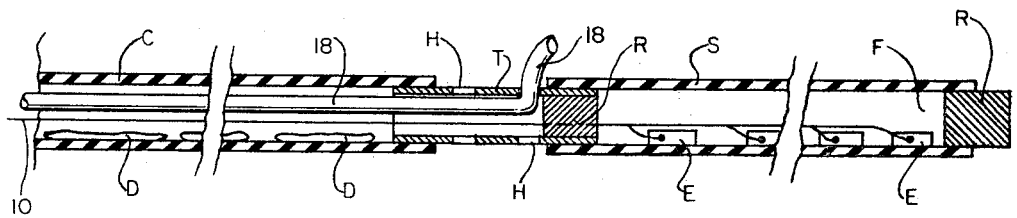
FIG. 3 is a cross-sectional view through a practical embodiment of a leader cable and streamer organization according to the present invention.

In the particular embodiment shown in FIG. 2 for illustrative purposes, a pressure transducer 36 is provided in a branch of pipe 38 which is connected directly to the depth measuring tube 18 and to a visual indicating gauge 40. The output of the pressure transducer 36 is fed to the differential servo 30, which compares this pressure with a manually adjustable pressure source 32 whose output is adjustable by suitable control means 31 to set into the servo 30 a selected pressure representing the desired depth of operation, so that the servo 30 can compare this selected pressure with the output of the transducer 36 to determine depth errors. The more pressure which is introduced into the tube 14, and therefore into the leader cable C as a result of the servo 30 opening the valve 26, the more water will be forced out of the cable C through the holes H, FIG. 3, and the more buoyant the leader cable C will become, thereby bringing the streamer S closer to the surface. However, as the array rises toward the surface, the water pressure in the tube 18 will also decrease, whereby the differential in pressure between the manually set pressure from the source 32 and the existing pressure in the cable 18 will be increased in one direction. Therefore, the servo mechanism will automatically operate to close the valve 26 and allow some of the air within the tube 14 to escape through the valve 42 which is cracked open to allow air pressure to slowly bleed off. Thus, the cable C will be lowered by increasing the level of water within it.

If the array sinks too deeply into the water, the pressure will rise within the sensing tubing 18, thereby introducing an opposite differential between the pressure in the tube 18 and the selected pressure at the source 34, whereby the servo mechanism will operate to open the valve 26 and introduce more air into the tube 14 to drive some of the water out through the leader cable C and raise its level toward the desired depth $d$ of operation.

As long as the sensing tube 18 is full of air, it will sense with considerable accuracy the depth of the streamer S. Thus, it is desirable either to blow the tube 18 free of water prior to each measurement, or else to allow a small amount of air to escape continuously through the valve 28 so as to keep the tube 18 continuously free of water. It has been found satisfactory to leave the valve 28 open slightly so that the tube 18 is flushed with air continuously, but at a very slow rate.

As a practical matter, the leader cable C is usually 300 to 500 feet in length and the streamer array S is usually between 100 to 300 feet long. An ordinary gas storage tank 16 filled with $CO_2$ serves to supply the gas needed in the pipes 22 and 24. This pressure can be regulated to a suitable supply level by a regulator 20, for instance about 20 p.s.i. A 20 p.s.i. pressure would be sufficient to permit the system to operate at depths down to a little over 40 feet, in view of the fact that the underwater pressure increases at a rate of about 0.45 pound per foot of depth. It is also to be noted that the differential servo mechanism 30 and associated pressure circuitry 32 and 36 can be omitted, and that an operator can manually control the valve 26 to maintain the desired pressure reading at the gauge 40, which may advantageously be calibrated in feet of depth.

Ordinary garden hose has proven to be very satisfactory as the leader cable C, and ordinary plastic tubing serves very well as the tubing 18 to provide continuous monitoring of the actual depth of the streamer array S.

One of the advantages of the present system is that all of the towed equipment is contained within the hose C and the streamer bladder S so as to create a minimum of water turbulence, whereby very low-noise towing can be obtained even at high speeds exceeding 10 knots.

The present invention is not to be limited to the exact form shown in the drawing, for obviously changes may be made therein within the scope of the following claims.

We claim:

1. Apparatus for towing a seismic streamer behind a vessel and for controlling its depth in the water, comprising:
   (a) a hollow cable connected to the vessel at its leading end and to the streamer at its trailing end and including means for admitting water to the cable in the vicinity of its trailing end, the cable comprising said towing apparatus;
   (b) means for weighting the cable to have neutral buoyancy when partially filled with water;
   (c) a source of compressed gas in said vessel;
   (d) a tube extending from the vessel through said cable and having an open end located near the trailing end of the cable;
   (e) restricted means connecting the tube to said source to flush the tube with gas at a very slow rate;
   (f) control valve means connecting said source to the leading end of said cable;
   (g) adjustable regulator means coupled to said source and providing a reference gas pressure representative of the water pressure at a selected depth; and
   (h) differential servo means having two inputs respectively connected to said tube and to said regulator means and operatively coupled to modulate said control valve means to cause the pressure in said tube to be corrected toward said reference pressure by varying the depth of the trailing end of the cable.

2. In apparatus as set forth in claim 1, first gauge means in the vessel connected to said tube, and second gauge means in the vessel connected to the leading end of said cable, and said gauge means showing mutually related pressure values respectively representing the measured depth of the trailing end of the cable and the pressure applied to the cable for correction toward the desired depth.

3. In apparatus as set forth in claim 1, restricted vent means connected with the leading end of said cable for slowly bleeding the gas pressure therewithin.

4. In apparatus as set forth in claim 1, said streamer comprising a hollow member containing seismic transducers; and a sleeve smoothly coupling said cable and said hollow member together, said transducers having wiring extending to the vessel through the sleeve and the cable.

5. In apparatus as set forth in claim 4, said hollow member being sealed beyond said sleeve, and the sleeve having an opening comprising said means for admitting water to the trailing end of the cable.

References Cited

UNITED STATES PATENTS

| | | | |
|---|---|---|---|
| 2,695,585 | 11/1954 | Montrose-Oster | 73—299 X |
| 2,735,303 | 2/1956 | Haase | 340—7 X |
| 3,299,399 | 1/1967 | Bowers | 340—7 |
| 3,308,425 | 3/1967 | McLoad | 340—7 X |
| 3,331,050 | 7/1967 | Kilmer et al. | 340—7 |
| 3,332,058 | 7/1967 | Loper et al. | 340—7 |

RODNEY D. BENNETT, *Primary Examiner.*

D. C. KAUFMAN, *Assistant Examiner.*